United States Patent [19]

Sloan

[11] Patent Number: 5,779,193

[45] Date of Patent: *Jul. 14, 1998

[54] CONTAINMENT SYSTEMS FOR INSULATION, AND INSULATION ELEMENTS EMPLOYING SUCH SYSTEMS

[76] Inventor: Frank P. Sloan, 1601-19 Lascelles Blvd., Toronto, Ontario, Canada, M4V 2B7

[*] Notice: The term of this patent shall not extend beyond the expiration date of Pat. No. 5,577,688.

[21] Appl. No.: 662,967

[22] Filed: Jun. 13, 1996

Related U.S. Application Data

[63] Continuation-in-part of Ser. No. 261,273, Jun. 15, 1994, Pat. No. 5,577,688.

[51] Int. Cl.$^6$ ............................................. B64C 1/40
[52] U.S. Cl. .......................... 244/117 R; 244/118.5; 244/129.1; 244/119; 52/406.2; 52/302.1
[58] Field of Search ..................... 244/117 R, 119, 244/117 A, 129.1, 118.5; 52/406.1, 406.2, 406.3, 407.3, 407.4, 592.1, 588.1, 302.1, 245

[56] References Cited

U.S. PATENT DOCUMENTS

| | | | |
|---|---|---|---|
| 2,817,123 | 12/1957 | Jacobs | 52/406.2 |
| 3,420,022 | 1/1969 | Brock | 52/302.1 |
| 3,501,879 | 3/1970 | Mitchell et al. | 52/302.1 |
| 3,740,905 | 6/1973 | Adams | 52/406.2 |
| 4,819,720 | 4/1989 | Howard | 244/117 A |
| 5,398,889 | 3/1995 | White et al. | 244/119 |

*Primary Examiner*—Galen L. Barefoot
*Attorney, Agent, or Firm*—Rogers & Scott

[57] ABSTRACT

Acoustic and thermal insulation for an enclosed space, particularly the passenger cabin of an aircraft, comprises insulating elements lining the interior wall. Each element is enclosed in a bag of thin flexible moisture impervious material and each bag is provided with an aperture at a lowermost point at which moisture condensed from humid air within the air will pool under gravity. A duct connects each element interior to the exterior of the enclosed space, so that air pressure in the bag can be equalised with that in the space without using air from the enclosed space. Any condensate in the bag can flow to the exterior, and only air from the exterior can enter the bag interior. The elements are formed in appropriate shapes, such as rectangular to fit in the cells formed between the frames and stringers of an aircraft fuselage, or so as to be wrapped around the frames. All of the elements in a column can be connected in series, so that each element in the column comprises part of the flow duct for the element above it. When the enclosed space is subject to a fast reduction in its internal air pressure the resultant air flow out of the bags carries with it any condensed liquid.

4 Claims, 5 Drawing Sheets

CONTAINMENT SYSTEMS FOR INSULATION, AND INSULATION ELEMENTS EMPLOYING SUCH SYSTEMS

This application is a continuation-in-part of U.S. application Ser. No. 08/261,273 filed Jun. 15, 1994, now U.S. Pat. No. 5,577,688.

FIELD OF THE INVENTION

This invention is concerned with new containment systems for thermal and acoustic insulation, and new thermal and acoustic insulating elements employing such systems, and especially but not exclusively to such containment systems and such insulating elements for use in aircraft. The invention is also concerned with methods of thermally and acoustically insulating enclosed spaces the internal pressures of which are subjected to periodic changes.

BACKGROUND OF THE INVENTION

The construction universally used for commercial aircraft is that of a skeleton framework comprising a plurality of spaced parallel transverse frames connected by longitudinally extending strings, the framework being covered externally by a thin stressed metal skin, and internally by decorative removable interior trim panels. Each cell between each pair of immediately adjacent frames and immediately adjacent strings is provided with its own insulating element, or a stack of elements to obtain the required thickness, a vapor barrier being provided on the warm side. In aircraft systems the vapor barrier usually is provided by enclosing each element completely in a bag of a thin flexible moisture-impervious plastics material to form what is commonly referred to in the industry as a pillow or blanket.

These aircraft insulation systems are subjected to conditions that are not encountered by those used, for example, in land-based installations such as buildings and automobiles. For example, the range of atmospheric pressure to which the system is subjected, and the rate at which that pressure changes, are much greater than the usual diurnal range due to changes in weather conditions, even though in the interest of passenger comfort the pressure inside the aircraft is maintained within a restricted range. With a land-based system the change of pressure caused by weather changes is usually in the range from 99 kPa to 104 kPa, and although changes of from 97 kPa to 106 kPa theoretically are possible they are unusual. Moreover, even with an abrupt weather change the rate of change of the pressure will still be much less than with an aircraft. Any increase in altitude is accompanied by a decrease in ambient pressure, but again in the case of, for example an automobile climbing into hilly country, the rate of change is much slower than with an aircraft. High flying aircraft have a substantially airtight fuselage, minor leakage outlets being present such as the toilet discharges, and the interior pressure is controlled to be as low as possible without passenger discomfort. Upon takeoff the cabin pressure is allowed to drop to a value within the range equivalent to that outside at about 2,400–3,600 meters (8,000–12,000 feet), all and any changes in the cabin pressure change being transmitted throughout the fuselage interior through the joints in the floor and between the cabin ceiling trim panels.

Another important difference in the conditions encountered is the rate of change of the ambient temperature to which an aircraft is subjected. The range of ambient temperature for which an aircraft must be designed is about the same as for other types of vehicles, in that both may be employed in hot (e.g. equatorial) locations where the vehicle surface temperature in direct sunlight can reach about 50° C. (132° F.), or in cold (e.g. arctic/antarctic) locations where the outside temperature can be as low as –50° C. (–60° F.). However, with a building or a vehicle other than an aircraft the normal diurnal temperature variation to which it is subjected usually is much smaller than this maximum range, in that hot location temperatures may rarely if ever go below zero, and cold location temperatures may rarely if ever go above zero, while the rate of change is also low. An aircraft taking off from, or landing at, an equatorially located airport can be subjected to almost the full range at a high rate of change, the period being only the relatively short time required to reach cruising altitude, or to descend and land. The frequency of change is also very much greater, in that even a long haul aircraft will usually make a number of ascents and descents during a working day, while short haul aircraft such as are used for hub connecting traffic will make a much larger number of ascents and descents in that period.

The atmospheric temperature is also always below zero celsius above about 2,400 meters (8,000 feet), and most passenger flights are well above that altitude, while for passenger comfort the temperature inside the cabin must of course be kept within a much more restricted range of about 20° C.–24° C. (68° F.–75° F.). It is inevitable therefore that comparatively frequently the temperature inside each insulation element adjacent to the outer metal skin will reach the dew point at which any water vapor inside the element bag will condense to water, while the temperature closer to the outer metal skin will be sufficiently low for it to deposit as ice.

The insulating materials used for the elements are primarily intended to meet relatively rigorous requirements as to noise, vibration and fireproofing, and thermal insulation although important is secondary to these; as is desirable with aircraft they should also be of the lowest possible weight. The material currently most commonly used is a special lightweight glass fibre, although recently this has begin to be replaced, at least partly by specially developed polyimide open cell foams, which however are considerably more expensive than the glass fibre materials. All of these materials essentially are porous and filled with air. The air pressure within the elements must be allowed to equalize with the cabin pressure, since with an impervious vapor barrier either the elements will bulge into the cabin as the cabin pressure drops, possibly dislodging the trim panels, or they will collapse inward as it increases and considerably reduce their insulation efficiency. To prevent these undesirable effects the envelopes are usually provided with relatively large openings, and it has been accepted that there will a resulting exchange of air between the cabin interior and the interiors of the elements. Even a small opening is highly effective in allowing the passage of water vapor from the more humid cabin interior into the less humid element interiors under the effect of its partial vapor pressure, which causes its rapid dispersion throughout the element interior. The transfer is made even more effective by lower temperatures in the element interiors, resulting in lower effective partial vapor pressures, so that more vapor is required for the equalisation. The transfer increases even further when any part of the element interior is below the dew point temperature, in that the water vapor condenses, further reducing the partial vapor pressure, so that even further transfer takes place.

This undesirable effect is exacerbated with high flying passenger aircraft during the periods when the relatively tightly closed aircraft cabin contains the crew and a large number of passengers, each of which adds moistened air to the cabin atmosphere via beverages, breathing and perspiration, so that the humidity is increases. As a result, during the period that the aircraft is at normal flying altitude, there can be considerable condensation of moisture within the insulation, reducing its effectiveness as acoustic insulation, so that the interior noise increases, and also reducing its effectiveness as thermal insulation, so that fuel consumption is increased. Such condensed moisture is found to have a particularly deleterious effect upon glass fibre insulation in that it already has a tendency to shake downward toward the bottom of its bag, and the weight of the moisture increases the tendency. When the amount of condensate becomes greater than the surface retentive capacity of the insulation material it pools in the bottoms of the cells, from which it usually is arranged to drain into a space between the elements and the metal outer skin, from whence it drains to the aircraft bilge for eventual discharge. The condensate adds undesired weight to the aircraft, and it has been estimated that a 300 seat aircraft can accumulate as much as 1,000 Kg (2,000 pounds) of excess weight in the form of such condensate, correspondingly increasing fuel consumption, and surreptitiously and dangerously increasing take-off weight. A not inconsiderable disadvantage is that the occasionally, especially as the aircraft accelerates or decelerates, pooled condensate in the cells above the cabin ceiling leaks on to the passengers below.

DEFINITIONS OF THE INVENTION

It is a principal object of the invention to provide new containment systems for thermal and acoustic insulation, and new thermal insulation elements employing such systems.

It is another object to provide such new containment systems and such new insulation elements especially suited for the special conditions encountered with high flying passenger aircraft, so as to maintain the insulation thermally and acoustically effective.

It is a specific object to provide such new systems and insulation elements with which the condensation and retention of water vapor within the elements can be significantly reduced.

In accordance with the invention there is provided a system for the containment of acoustic and thermal insulation elements used for the insulation of the interior of an enclosed space constituted by at least one external wall, a plurality of said elements being applied for that purpose on the inside surface of the external wall or walls of the space;

wherein each of the elements comprises a body of thermally insulating material enclosed in a bag of moisture impervious material, each bag having at a lowermost point at which moisture condensed therein will accumulate under gravity an aperture or apertures connecting the bag interior to its exterior;

the system also comprising an air and liquid flow duct connecting each bag aperture, and thereby the bag interior, to the exterior of the enclosed space so that air and condensed liquid at the lowermost point flows therethrough to the enclosed space exterior;

said aperture or apertures and the respective flow duct or ducts comprising the means through which air form the enclosed space exterior can enter and leave the bag interior for equalisation of pressure between the bag interior and that of the ambient atmosphere within the enclosed space.

Also in accordance with the invention there is provided an insulation element for insulating the interior of an enclosed space constituted by at least one external wall by application of the element to the inside surface of the external wall;

the element comprising a body of insulating material;

a bag of moisture impervious sheet material enclosing the body of insulating material;

an aperture or apertures connecting the bag interior to its exterior respectively at a point or points in the bag wall which when the bag is installed on the external wall inside surface is respectively a lowermost point or points thereof, so that moisture condensing within the bag can accumulate under gravity at this point or points for discharge from the bag interior therethrough; and an air and liquid flow duct connected to each aperture, the aperture or apertures and the respective flow duct or ducts also permitting entry and exit of air for equalisation of pressure between the bag interior and that of the atmosphere ambient to the element.

Further in accordance with the invention there is provided a method of insulating the interior of an enclosed space enclosed by at least one external wall and subject to fluctuations in the ambient air pressure within the enclosed space interior, the interior surface of the external wall having applied thereto a plurality of insulating elements, and of containing the insulating elements each of which comprises a body of thermally insulating material;

comprising enclosing each element in a bag of moisture impervious sheet material;

providing each bag with an aperture or apertures respectively connecting the bag interior to its exterior at a lowermost point or points in the bag wall, so that moisture that condenses within each bag can accumulate under gravity at this lowermost point or points;

venting each element interior through the respective aperture to an outside space outside the enclosed space interior through an air and liquid flow duct or ducts through which air can only flow between the bag interior and the outside space and cannot enter the enclosed space interior;

whereby a decrease in the ambient pressure outside the enclosed space interior relative to the pressures within the bag interiors and consequence movement of air from the bag interiors for equalisation of these pressures through the flow duct or ducts acts to carry condensed liquid from the bag interiors to the outside space.

Further in accordance with the invention there is provided an insulation element retainer clip for an insulation element for an aircraft comprising a plurality of longitudinally spaced transverse frames and a plurality of circumferentially spaced longitudinally extending stringers, each frame having a plurality of frame insulating elements wrapped around the respective frame with adjacent elements butted end to end, the retainer clip comprising a metal spring member wrapped around the respective frame insulating element to retain it on the respective frame.

Preferably the insulated space is an aircraft passenger cabin disposed above a non-passenger space of the aircraft and each air and liquid flow duct connects its respective bag interior to the interior of the non-passenger space.

A plurality of insulation elements may be disposed one above the other in the form of a column with their interiors connected in series with one another, so that each immediately lower element bag constitutes part of the air and liquid flow duct from its immediately upper element bag to the enclosed space exterior.

DESCRIPTION OF THE DRAWINGS

Insulation enclosure systems, enclosed insulation elements, and methods of operating such insulation systems, that are particular preferred embodiments of the invention will now be described, by way of example, with reference to the accompanying diagrammatic drawings, wherein.

DESCRIPTION OF THE PREFERRED EMBODIMENT

Figure 1:
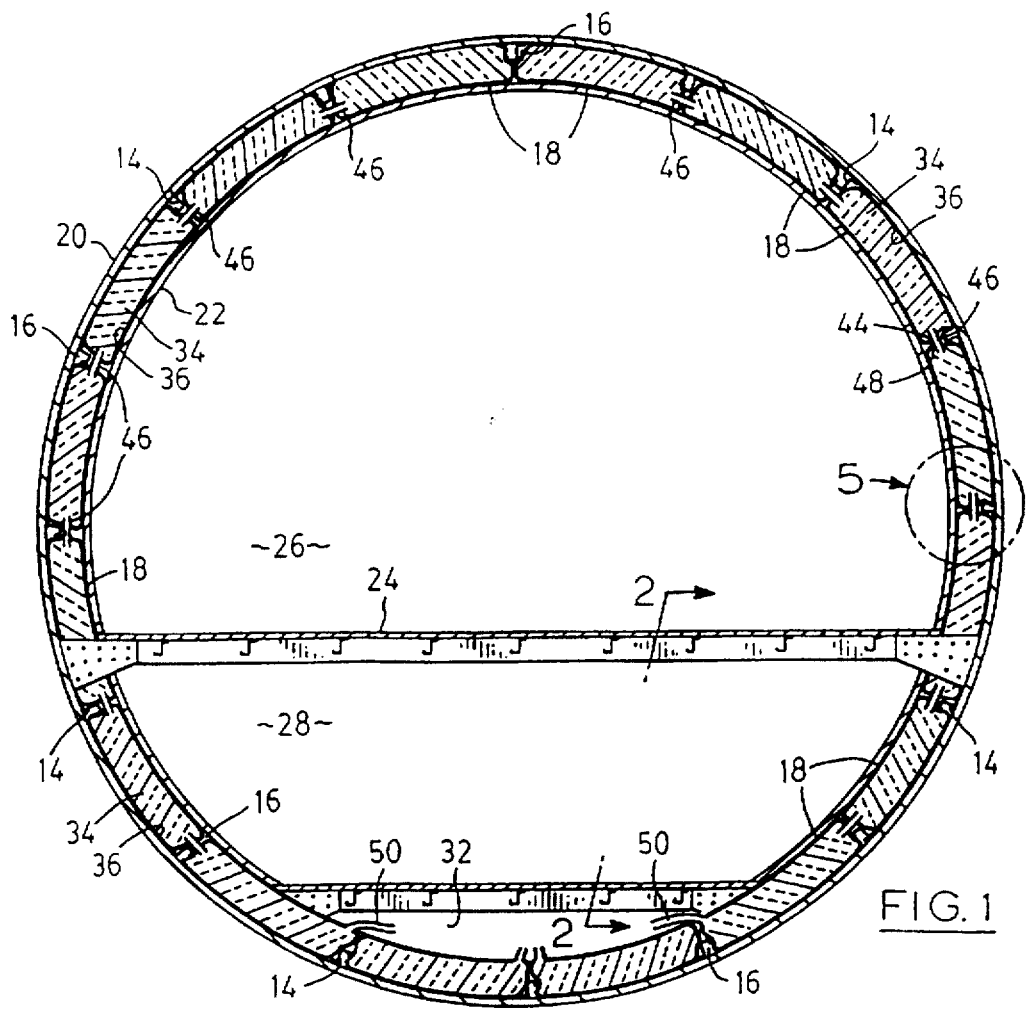
FIG. 1 is a transverse cross section through a portion of an aircraft fuselage insulated with elements of the invention.
Figure 2:
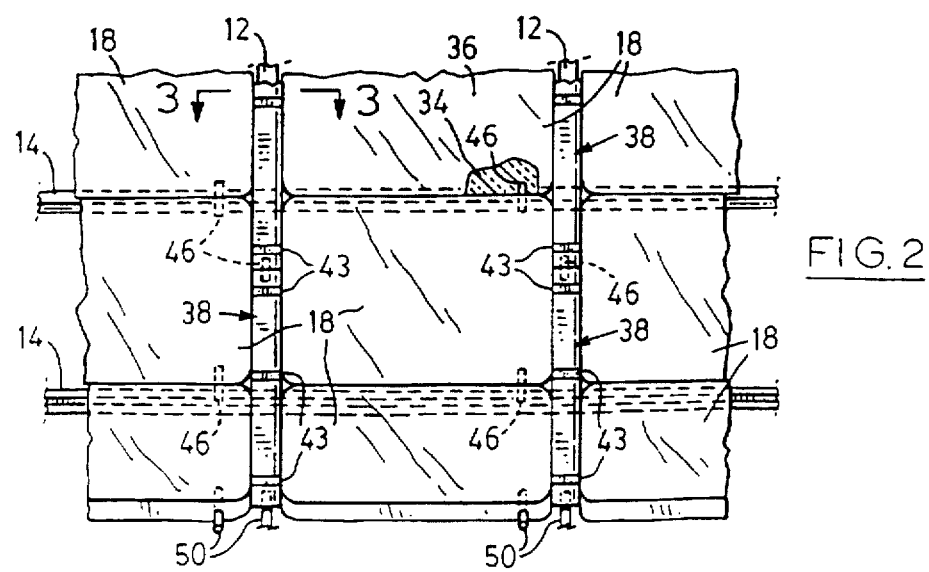
FIG. 2 is a side elevation taken on the line 2—2 in FIG. 1.
Figure 3:
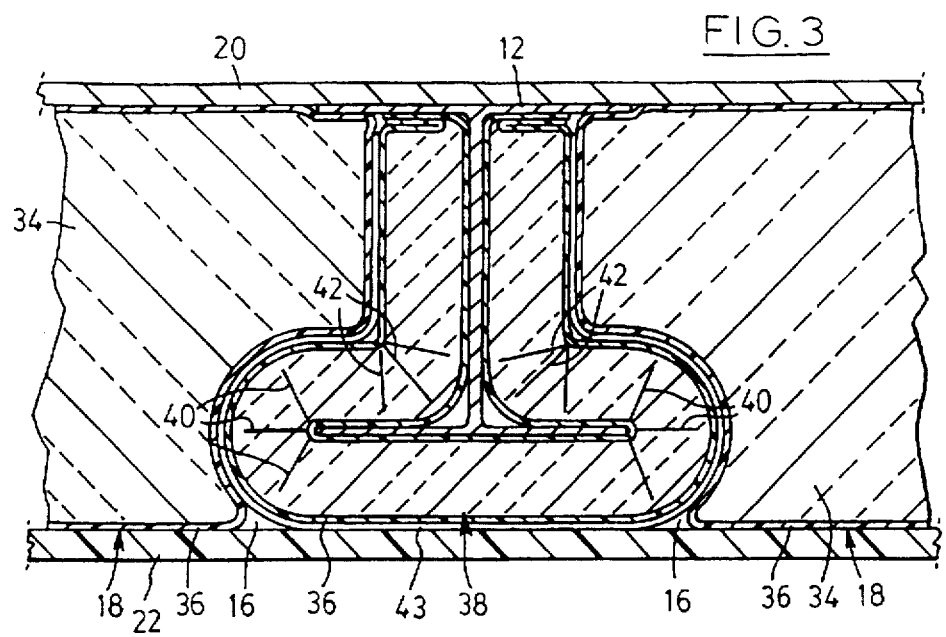
FIG. 3 is a cross section at a transverse frame of the aircraft fuselage, taken on the line 3—3 in FIG. 2, to show a frame insulation element in accordance with the invention, the figure showing in end elevation a retainer clip in accordance with the invention.

A typical aircraft fuselage structure 10, as illustrated by FIGS. 1–3, comprises a plurality of longitudinally spaced circular frames 12 connected together a plurality of circumferentially spaced longitudinally extending stringers 14, the frames and stringers cooperating to form a plurality of approximately rectangular shaped cells 16, each of which received one or more sound, vibration and thermal insulating elements 18. Each cell is closed externally by a thin stressed metal skin 20 and internally by interior trim panels 22. In this embodiment the interior of the fuselage is divided by a cabin floor structure 24 into a passenger-containing cabin 26 and a non-passenger-containing baggage compartment 28; floor structure 30 of the baggage compartment separates its interior from that of bilge 32.

The central portion of an aircraft fuselage is usually of substantially uniform diameter along its length and the cells in this portion are therefore of rectangular front and rear elevation; most of the elements are rectangular shape and of size so as to fit tightly into the respective cell and fill it as much as possible, thereby minimizing as much as possible any free space in the cells into which moisture laden air from the cabin interior can pass. Others of the elements are of special shape so as to fit tightly around the cabin windows, in any doors, and around any door openings. The nose and tail portions of the fuselage are of course tapered and the elements are shaped to correspond with the resultant cell shapes, and so that they will also fit tightly into the cells. In this embodiment each element 18 comprises a body 34 of a suitable insulating material, such as glass fibre or open cell polyimide foam, enclosed in a tightly-fitting bag 36 of a thin moisture impervious flexible material. In this embodiment each cell is filled with a single element of thickness sufficient to extend between the outer metal skin and the respective interior panel, but in other embodiments it may be preferred to use a plurality of thinner elements stacked on behind the other. The plurality of elements sandwiched between two immediately adjacent circular transverse frames may be regarded as two columns of elements meeting at the uppermost part of the fuselage above the cabin ceiling and in the lowermost part of the bilge.

Figure 4:
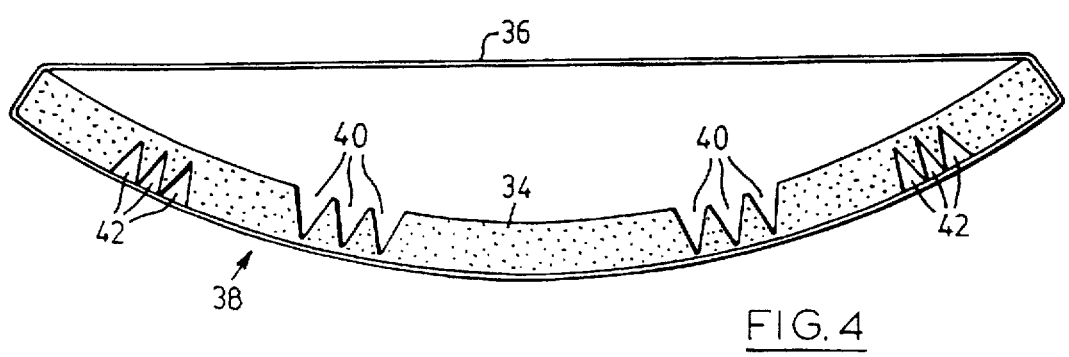
FIG. 4 is an end elevation of a frame insulation element prior to its installation.

Substantial sources of sound transmission and heat loss are the metal transverse frames 12, since they protrude into the cabin interior; this also makes it difficult to provide them with insulation of adequate thickness without encroaching into the available cabin space. In this embodiment the frames are constituted by beams of I cross section and each is insulated by a plurality of frame enclosing insulating elements 38 butted end to end around the frame. Each of these elements 38 also comprises a body 34 of insulating material and an enclosing flexible impervious bag 36. If the body is a highly flexible material such as glass fibre than a pad of appropriate size can be folded around the frame, but this is not usually possible with a more rigid material such as polyimide foam. Therefore with such more rigid materials, as is illustrated by FIG. 4, prior to its installation the body 34 is provided on one side with two spaced sets of closely spaced V-cross section grooves 40, and on the other side with two spaced sets of closely spaced V-cross section grooves 42. The mid portion of the body 34 between the grooves 40, together with the adjacent portion of the enclosing bag, is applied to the frame inner surface, the grooves permitting the body to be folded through 180 degrees around the inner flange of the I beam, while the grooves 42 permit the body to be folded through 90 degrees at the respective junctions between the inner flange and the I beam cross web. Once installed each element is retained in its wrapped configuration by vertically spaced spring clip members 43 formed from flat metal strip that embrace the outside of the element. Each of these clip members has a body portion of C-shaped that embraces the inner end flange of the frame to hold the insulation element folded around it, while two parallel arm portions extend from the mouth of the C to embrace the portions of the element that butt against the frame cross web and hold them in close contact therewith. As with the cell-filling elements, the set of frame-embracing elements can be regarded as two columns of elements meeting at the fuselage topmost and bottommost points.

Each bag 36 of both the cell and frame insulating elements is provided at a point that when it is installed is its bottom end, and accordingly that is its lowermost point, with an outlet aperture 44, so that any moisture condensing within the bag and not retained on the surfaces of the material of the body 34 will accumulate and pool under gravity at this point. In this embodiment only a single such aperture is required for each bag, but in the case of a much larger bag more than one aperture may be required, each located at a corresponding lowermost point. This aperture is the inlet to and outlet from the bag interior for air passing between the bag interior and its exterior, and accordingly the outlet from the bag for any such condensed mixture. In this embodiment the outlet 44 of each bag is connected by an air and liquid flow duct, constituted by a respective connection 46, to an inlet aperture 48 at the uppermost part of the bag of the immediately adjacent next lowest element, so that air and condensed moisture from an upper bag can only pass downward into the respective next lower bag, and similarly air and condensed moisture in a lower bag can only pass upward into the respective next upper bag. Air will pass relatively easily in both directions, and may have water vapor entrained therein, while the condensed liquid will move under gravity relatively easily downward, but is most unlikely to move upward, since the rates of air flow usually will not be high enough. The normal action is therefore for it to drain steadily downward through the interiors of the respective columns of elements. In this embodiment the two uppermost elements in each column are not connected together, although they can be if that is preferred.

The two opposite rows of the lowermost cell-filling elements 18 and the frame-enclosing elements 38 in the respective passenger cabin walls are connected by respective liquid and air flow ducts 50 (FIGS. 1 and 2) to discharge into the bilge space 32. Thus, each column of elements discharges eventually into a space outside of the enclosed cabin interior, which in this embodiment is the bilge. In other embodiments they may instead discharge into the baggage compartment interior 28, when the advantage of the invention will also be obtained, in that inherently the humidity of the air in the non-crew and non-passenger containing parts of the fuselage is much lower than in the passenger-containing parts. When reference is made herein to the aircraft cabin it is assumed that the crew-containing cockpit is to be regarded as part thereof. The elements lining the baggage compartment and bilge compartment spaces are simply vented directly into those spaces, although if preferred they may be vented in other ways, as is described below.

As the aircraft takes off the air pressures in the cabin, baggage compartment and bilge decrease to equalize with the air pressure outside the aircraft. The excess air in the insulation elements cannot pass out through the air and moisture impervious bag walls, but will pass readily through the relatively highly porous element bodies 34, their respective connections 46 and the ducts 50 into the bilge interior, so that the internal pressures in the bags can equalize readily with their external pressures and there will be no problem with unwanted expansion of the bags and the possibility of the interior trim panels 22 being displaced. This air cannot therefore directly enter the cabin interior and if any moisture in the bags has condensed to liquid, then this condensate will be resting in the bags immediately adjacent to the respective outlets 46, and will be expelled by the exiting air into the next lowest bag, and so on until it is discharged into the bilge interior. The bilges of many aircraft are provided with valves through which the ground crew removes any accumulated water while the aircraft is on the ground, if no provision is available for its removal while in the air.

While the aircraft is in flight, even though the cabin interior may become relatively highly saturated with water vapor by expiration from the passengers, and from other activities therein such as the serving of drinks and hot moist foods, there is no possibility of direct communication between the cabin interior and the element bag interiors through the bag walls, as with the prior art insulating structures described above, and therefore no possibility of direct entry of air from the cabin into the interiors of the elements. Moreover, since the elements are fitted tightly into the cells and around the frames, there is a minimum of free spaces into which moisture laden air can enter, and into which water can condense; the small amount that does reach these free spaces will usually freeze and thaw upon the aircraft reaching the ground, when it will drain in the usual way to the bilge. As the aircraft descends below the level at which the aircraft interior has been pressurized, and the pressures within the various compartments begin to increase again from the cruising value, air can only flow into the insulating element interiors through the ducts 50 and the connections 46, and this air is the relatively dry air in the bile, or the baggage compartment, depending upon where the ducts 50 discharge. Even though the bilge may initially have contained condensate that accumulated as the aircraft ascended it and the baggage compartment are constantly supplied with very dry air from outside the fuselage. If while descending there is still some condensate present its relative humidity will still be much lower than in the cabin, and will be even lower when the condensate has been removed, either by discharging or by evaporation into the dry air.

As was explained above, the presence of any moisture within the insulation elements reduces their efficiency for both thermal and acoustic insulation, and with the above-described prior art systems once moisture has entered the elements it becomes extremely difficult to remove, the main means of removal being when it pools as condensate, which still leaves moisture that has condensed or even frozen on the considerable surface areas inherently provided by the insulation material. It is an advantage of the invention over these prior art systems that it not only inhibits the entry of moisture to the bag interiors in the first place, but also provides for its removal by the supply of dry air to the bag interiors, which will cause evaporation from the insulation material surfaces under the effect of the partial vapor pressure.

Thus, the enclosure system of the invention makes use of the fact that while airborne inherently the air non-passenger containing compartments of an aircraft are of very low relative humidity. Once the aircraft is above the altitude at which the cabin pressure has been stabilized then it is necessary to draw in outside air, pressurize and heat it, and deliver the pressurized, heated air to the cabin and baggage compartments; even if not supplied directly to the bilge it will leak into that space. Because of its already low temperature at these altitudes this outside air is also of very low relative humidity, and this is even further decreased as it is heated. This low relative humidity is advantageous when the air is injected into the cabin, since it helps to counteract the excess humidity therein, and it is a positive advantage in the systems of the invention, in that the interiors of the elements are always supplied with this relatively very dry air, minimizing the possibility of any moisture condensation therein, and also providing an effective vehicle for evaporation and removal of any condensed liquid.

The problem of the excessive condensation of moisture in aircraft interiors, and in their insulation, has been exacerbated by the decision of many airline companies to ban tobacco smoking on their flights. When smoking was permitted it was necessary to replace the cabin air relatively frequently to avoid any objectionable buildup of tobacco smoke, so that the humid cabin air was replaced or at least diluted correspondingly frequently with dry outside air. Without smoking the rate of replacement can be reduced and airlines have taken full advantage of this because of the resultant saving of fuel, but with existing insulation systems it has been accompanied by a noticeable increase in the amount of condensed moisture. This has been made evident to the passengers by an increase in the incidence of condensed water spraying through the joints in the cabin ceiling on to the seats below.

Figure 5:
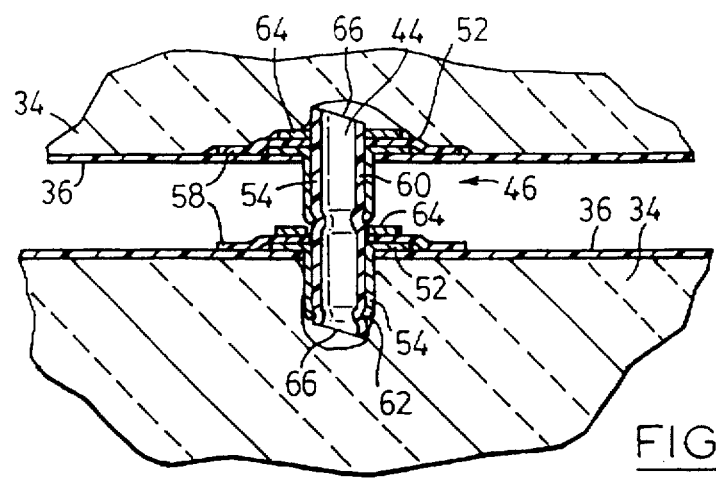
FIG. 5 is a longitudinal cross section through a connection between two of the insulation elements of FIGS. 1–4, being an enlarged view of the circled portion 5 in FIG. 1, showing also a preferred construction for a connection between an air and liquid flow duct and the respective aperture of an element.
Figure 6:
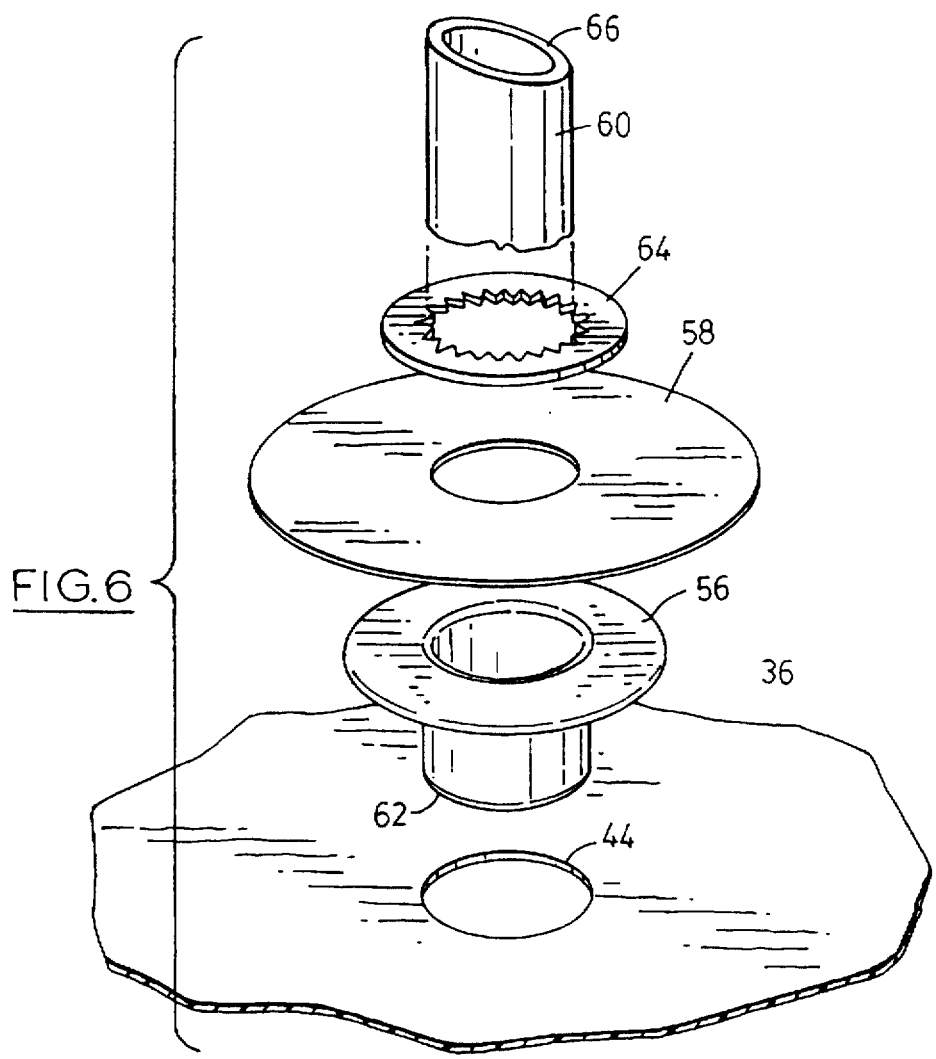
FIG. 6 is an exploded view of part of the connection of FIG. 5, showing the connection between the air and liquid flow duct and the respective aperture of an element.

With the large number of elements required to insulate even one of the smaller commercial aircraft it is essential to provide a form of connection 46 and outlet duct 50 that is secure while being simple and inexpensive to manufacture; in the case of a connection it must also be easy to connect and disconnect. A structure which meets these requirements to a substantial extent is illustrated by FIGS. 5 and 6. A body portion which connects the bag aperture to the flow duct is constituted by a flanged tubular metal grommet 52 of a non-corrodible metal such as brass, comprising a tubular portion 54 that is a snug fit in the respective aperture and a radially extending flange 56 at one end. Such grommets are used extensively to form rope-receiving holes in tarpaulins and are therefore readily available at low cost. In the case of an outlet aperture 44 the tubular body is passed through it until the flange contacts the bag inside surface, while in the case of an inlet aperture 48 the tubular body is passed through it until the flange contacts the bag outside surface. The grommet is then held securely in position by the application over the flange and the adjacent bag surface of an annulus 58 of thin sheet material provided on the required side with an adhesive layer.

When the air and liquid flow duct also constitutes the connection between the two grommets this duct comprises a short length of tubing 60 of plastics material of external diameter such as to fit snugly within the bore in the tubular portion 54. The free end 62 of the tubular portion is turned slightly inward and has a sharp edge which digs into the plastics tubing and inhibits withdrawal of the tubing from the grommet once it has been inserted, without however preventing its withdrawal if this should be needed to disassemble the connection. Excessive movement of the tubing into the grommet is prevented by a locking ring 64 having inwardly directed teeth that dig into the tubing outer wall. If the duct is a discharge duct at the bottom of a column of elements then the tube 60 is made sufficient long for that purpose.

The apertures in the bags are positioned so that with the elements in position in their cells and on their frames they will register vertically with one another. All that is then necessary is to push the piece of tube 60 of each outlet into the grommet of its respective inlet in the next lowest element. The top and bottom ends 66 of each piece of tube are cut at an angle so that they cannot be closed off by the insulating material as they are pushed into the body; an angle in the range 20°–40° is usually satisfactory. Usually the tube is pushed fully home until the outlet grommet contacts the inlet lock ring 64, whereupon the plastics tubing is completely surrounded by metal and thereby protected against heat and damage. If at any time the connection must be disassembled this is readily accomplished by pulling the grommets apart; this may damage or even destroy the plastics tube, but this is inexpensive and easily replaced.

Figure 7:
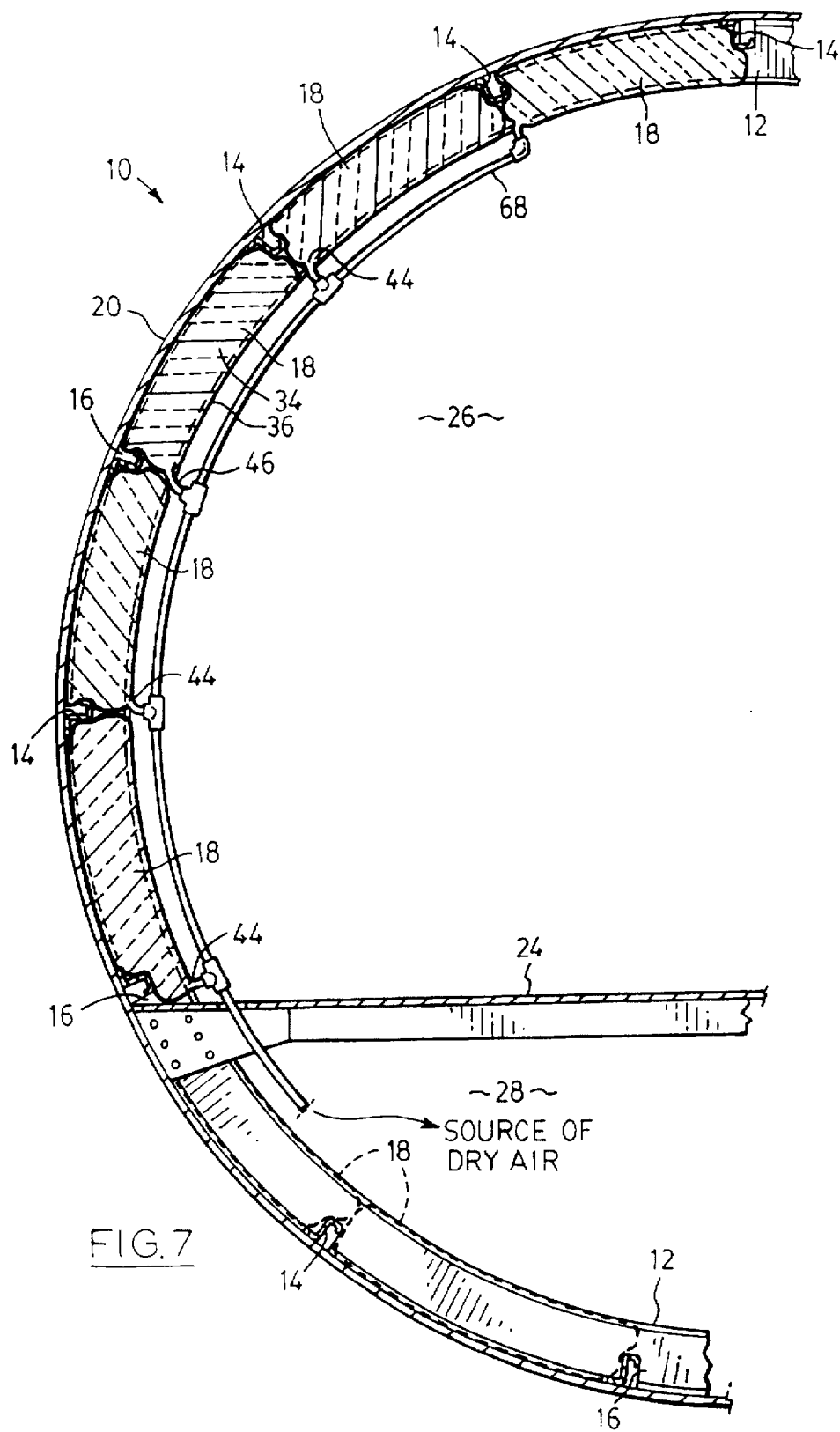
FIG. 7 is a part transverse cross section similar to FIG. 1 illustrating other embodiments of the invention.

Although in this embodiment the elements are connected in series, with each lower element constituting part of the flow duct means for the elements above it, in other embodiments each element may be vented separately to the exterior space, such as the baggage compartment or bilge, by means of a separate tube 50 (not illustrated) of appropriate length that passes alongside the lower elements. FIG. 7 illustrates other embodiments in which the elements are connected to a common vent pipe 68 that discharges into the baggage compartment or bilge. For clarity of illustration the pipe 68 is shown as protruding into the cabin interior, but in practice it will pass alongside the elements behind the cabin trim panels. In a further embodiment the entry of only very low humidity air into the element interiors is assured by connecting the venting ducts 50, usually by a common manifold (not shown) to a source of dry air (not shown), such as to an outlet of the aircraft heat exchange unit (not shown) that receives air from outside the aircraft and heats and pressurizes it before supplying it to the aircraft interior; as explained above such air inherently is of extremely low humidity. In addition, if desired, the air in the elements can be maintained by the source of dry air at a pressure slightly above the cabin pressure, but not enough to cause any substantial pressing of the element bag walls against the trim panels, to further ensure that humid cabin air cannot enter them.

Although with these embodiments the invention has been described in its application to the insulation of an aircraft, it can with advantage be applied to the insulation of other types of structure in which there is an enclosed space constituted by at least one external wall, and there is the opportunity of venting the interiors of the insulating elements to exterior, so that only dryer air from the enclosed spaced exterior can flow through the elements. The invention is therefore for example applicable generally to all commercial and residential buildings in which the presence of excessively humid air in the enclosed spaces is found to cause condensation in the insulation, and is therefore a problem that is met by the invention. A particular example of a commercial structure is a refrigerated building used for the storage and aging of large quantities of meat; during this storage the meat expires considerable quantities of moisture into the enclosure interior which should be prevented from entering the insulation and reducing its effectiveness.

Figure 8:
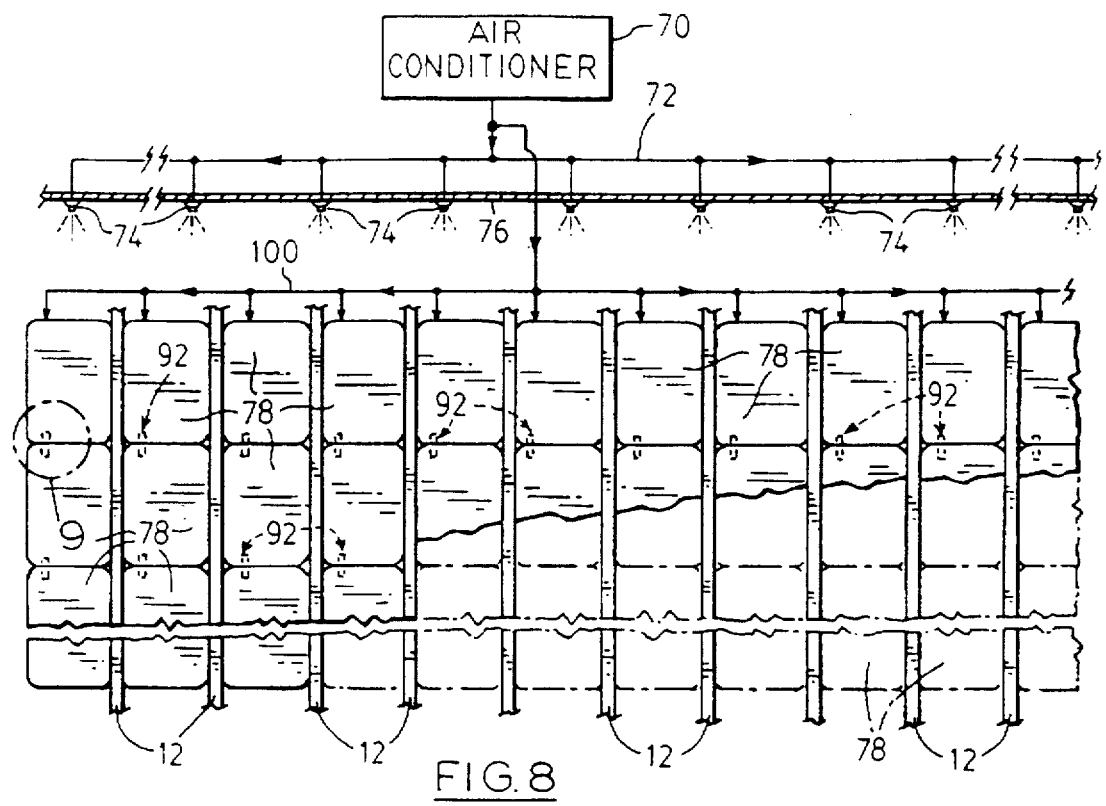
FIG. 8 is a schematic view of a further embodiment.
Figure 9:
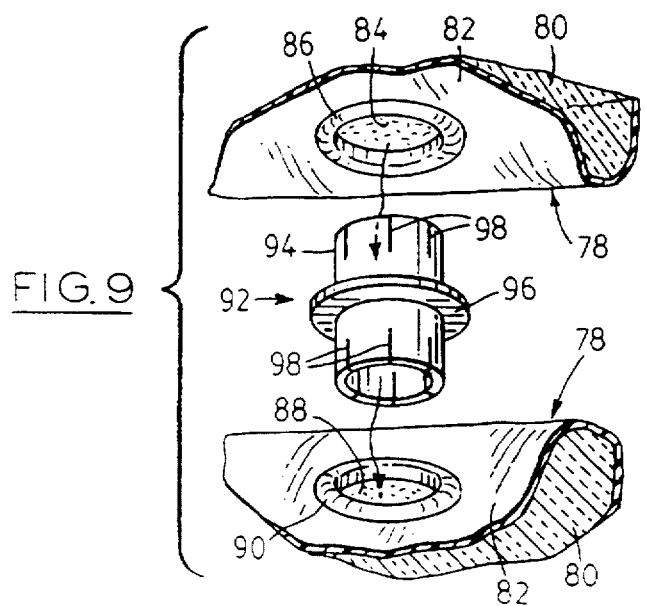
FIG. 9 is an enlarged perspective view of the area circled in FIG. 8 and showing a connector and the manner of its connection to two insulation elements.

In the embodiment shown in FIGS. 8 and 9, an aircraft air conditioning unit 70 supplies relatively dry cool air through supply conduits 72 to cooling air outlets 74 in the cabin roof 76. In this further embodiment, each insulation element 78 comprises a body 80 of thermally insulating material enclosed in a bag 82 of substantially moisture impervious material. The insulation elements 78 arranged, in columns, each column filling the space between circular frames 12, and the insulation elements 78 in each column being stacked one upon another so that remaining air space between the frames 12, metal skin 20 and trim panels 22 (see the earlier figures) is minimized.

The bag 82 of each insulation element 78 as an aperture 84 at the bottom containing a circular metal grommet 86 and an aperture 88 at the top containing a circular metal grommet 90. The bags 82 of adjacent insulation elements 78 are connected by connectors 92 of plastic material, each connector 92 having a tubular body 94 with an annular flange 96 midway along its length. The end portions of the tubular body 94 have circumferentially spaced longitudinally extending slits 98 which extend from the relevant end to a distance approximately halfway between the end and the flange 96.

In use, the upper end of the connector 92 is pushed into the grommet 86 at the lower end of the upper insulation element 98 until the flange 96 engages the grommet 86. The slits 98 in the tubular body 94 provide resilient flexibility during insertion into the grommet 86, and the unslotted portion of the body 94 near the flange 96 provides a good friction fit, with the portion of the body 94 between the slits 98 and the flange 96 also providing a slight snapping fit due to radially outward movement of the slitted portion after insertion. The lower end of the connector 92 is similarly assembled with the grommet 90 at the upper end of the lower insulation element 78.

The cooling air supplied by the air conditioner 70 to the passenger cabin of a modern aircraft is of very low humidity and has a somewhat higher pressure than the ambient cabin pressure. In addition to being supplied to the duct 72, the cooling air is also supplied through duct 100 to the upper end of the upper insulation element 78 in each column, the duct 100 being connected to each upper insulation element 78 by a connector (not shown) generally similar to the connector 92. The bottom of the lowermost insulation element 78 is closed by a suitable plug (not shown) fitted into the grommet 86 thereof. The insulation elements 78 in each column are therefore supplied with cool dry air from the air conditioner 70, with the air passing from one insulation element 78 to a lower insulation element 78 through the connectors 92. Due to the slightly higher air pressure in the insulation elements 78 compared to the exterior thereof, the insulation elements 78 will be caused to expand to substantially fill the space between the metal outer skin 20 and the trim panels 22, thereby minimizing condensation on the interior of the metal outer skin 20.

The bags 82 of the insulation element 78 will usually be of thin plastic sheet material which will be slightly pervious to air, so that air can pass therethrough into or out of the insulation elements 78 depending upon the nature of the pressure difference between the interior of the insulation elements 78 and the aircraft cabin. This will depend on the amount of pressurisation of the cabin as previously described. If the bags 82 are not sufficiently pervious for this purpose, small openings may be provided therein. Apart from this small amount of air flow through the bags 82, there is no other air flow through the insulation elements 78.

Therefore, not only is there little likelihood of water condensing in the insulation elements 78 but, since the insulation elements 78 substantially fill the space between the metal outer skin 20 and the trim panels 22, there is very little air contacting the metal outer skin 20 and hence very little condensation thereon.

The invention therefore also provides a system for the containment of thermal insulation elements used for the insulation of the interior of an enclosed space constituted by at least one external wall, a plurality of said insulation elements being applied for that purpose on the inside surface of the external wall or walls of the space, wherein each insulation element comprises a body of thermally insulating material enclosed in a bag of substantially moisture impervious material, the system also including a source of relatively dry air at a pressure slightly higher than the ambient air pressure in said enclosed space, and connectors connecting said source of relatively dry air to the interior of said thermal insulation elements.

Some insulation elements may be connected directly to the source of relatively dry air, and other insulation elements may be connected to the source of relatively dry air indirectly through the interior of at least one other insulation element. The bags of the insulation elements may have means, such as slight porosity to provide slight leakage of relatively dry air therefrom. Alternatively, such leakage may be effected by small openings in the bags of valve devices which open to permit release or air from the bags when the air pressure in the bags exceeds the pressure on the exterior thereof by a predetermined value.

Other embodiments of the invention will be readily apparent to a person skilled in the art, the scope of the invention being defined in the appended claims.

I claim:

1. A system for the containment of thermal insulation elements used for the insulation of the interior of an enclosed space constituted by at least one external wall, a plurality of said elements being applied for that purpose on the inside surface of the external wall or walls of the space:

wherein each insulation element comprises a body of thermally insulating material enclosed in a bag of substantially moisture impervious material, the system also including a source of relatively dry air at a pressure slightly higher than the ambient air pressure in the enclosed space, and connectors connecting the source of the dry air to the interior of the thermal insulation elements.

2. A system according to claim 1 wherein some insulation elements are connected directly to the source of relatively dry air, and other insulation elements are connected to the source of relatively dry air indirectly through the interior of at least one other insulation element.

3. A system according to claim 1 wherein the bags of the insulation elements have means to provide slight leakage of relatively dry air therefrom.

4. A system according to claim 4 wherein each other insulating element has an aperture of the top and bottom thereof containing a circular grommet, and adjacent other insulating elements are connected to each other by connectors, each connector having a tubular body with an annular flange midway along its length and end portions with circumferentially spaced longitudinally extending slits extending from the relevant end, one end portion of each connector body having being inserted into the grommet at the lower end of an upper insulation element and the other end of each connector body having being inserted into the grommet at the upper end of a lower insulation element, said slits providing resilient flexibility during insertion and portions of the connector body between the slits and the flange providing a slight snapping fit.

* * * * *